United States Patent [19]
Patterson

[11] 4,274,278
[45] Jun. 23, 1981

[54] TRANSMISSION TESTING MACHINE AND METHOD

[75] Inventor: Gene L. Patterson, Springfield, Mo.
[73] Assignee: Dayco Corporation, Dayton, Ohio
[21] Appl. No.: 93,327
[22] Filed: Nov. 13, 1979
[51] Int. Cl.³ .......................................... G01M 13/02
[52] U.S. Cl. ......................................... 73/7; 73/118; 73/162
[58] Field of Search ............................. 73/7, 118, 162

[56] References Cited

U.S. PATENT DOCUMENTS

| | | | |
|---|---|---|---|
| 1,749,297 | 3/1930 | Norman | 73/7 |
| 2,371,607 | 3/1945 | Collins | 73/162 X |
| 2,869,361 | 1/1959 | Powell et al. | 73/162 X |
| 3,078,711 | 2/1963 | Shutt | 73/162 |
| 3,690,168 | 9/1972 | Petersen | 73/162 |
| 3,739,632 | 6/1973 | Miller et al. | 73/162 X |
| 3,956,929 | 5/1976 | Jenkins et al. | 73/162 X |

Primary Examiner—James J. Gill
Attorney, Agent, or Firm—Charles E. Bricker

[57] ABSTRACT

A machine and method for testing a power transmission device are provided wherein the machine comprises a drive for driving the power transmission device and means for loading the power transmission device wherein the loading means comprises a power recovery system comprising a coupling having an input shaft and an output shaft with the shafts being free of mechanical connections therebetween, apparatus operatively connecting the power transmission device to the input shaft, and apparatus operatively connecting the output shaft to the drive, with the coupling having integral means operating to drive the output shaft at a speed which approaches but is less than the speed of the input shaft to thereby provide supplementary power for the drive in driving the power transmission device and with the system providing testing for any desired loading of the power transmission device with only the power necessary to overcome power losses in the machine thereby resulting in a substantial power recovery.

30 Claims, 9 Drawing Figures

TRANSMISSION TESTING MACHINE AND METHOD

BACKGROUND OF THE INVENTION

1. Field of the Invention

This invention relates to a machine for and method of testing power transmission devices and especially to the testing of power transmission belts.

2. Prior Art Statement

There are numerous apparatus and methods employed in industry for the testing of power transmission devices of all types and the tests performed on these devices may be simple performance tests, tests conducted while subjecting the devices to special ambient conditions, life tests at normal ambient conditions, and the like. Especially in the case of a life test of a device under normal ambient conditions the device is operated under predetermined load conditions until it fails, and the general practice has been to drive such device with a drive which is usually an overcapacity drive, while providing cooling of test components and support bearings as required to prevent overheating. The net result is a substantial and unnecessary loss of power and hence energy.

SUMMARY

It is a feature of this invention to provide a machine of testing a power transmission device with testing being achieved with minimum loss of power and energy.

Another feature of this invention is to provide a machine of the character mentioned capable of being utilized for testing any type of power transmission device known in industry.

Another feature of this invention is to provide a machine of the character mentioned particularly adapted for testing power transmission belts made primarily of polymeric material.

Another feature of this invention is to provide a machine for testing a power transmission device comprising a drive for driving the power transmission device and means for loading such power transmission device wherein the loading means comprises a power recovery system which comprises a coupling having an input shaft and an output shaft with the shafts being free of mechanical connections therebetween first means operatively connecting the power transmission device to the input shaft, and second means operatively connecting the output shaft to the drive with the coupling having integral means operating to drive the output shaft at a speed which approaches but is less than the speed of the input shaft to thereby provide supplementary power for the drive in driving the power transmission device, and with the system providing testing for any desired loading of the power transmission device with only the power necessary to overcome power losses in the machine thereby resulting in a substantial power recovery.

Another feature of this invention is to provide a machine of the character mentioned in which the second means operatively connecting the output shaft of the coupling to the drive may comprise a second power transmission device which is tested simultaneously with the first-named power transmission device.

Another feature of this invention is to provide a machine of the character mentioned for testing the above mentioned first and second power transmission devices which also employs an adjustable output torque motor and means operatively connecting the torque motor to the output shaft of the coupling to thereby assure that the output shaft in cooperation with the means operatively connecting the output shaft to the drive operates the second power transmission device at substantially the same conditions as the first-named power transmission device.

Another feature of this invention is to provide an improved method of testing a power transmission device with minimum loss of power and energy.

Therefore, it is an object of this invention to provide a machine for and a method of testing a power transmission device having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
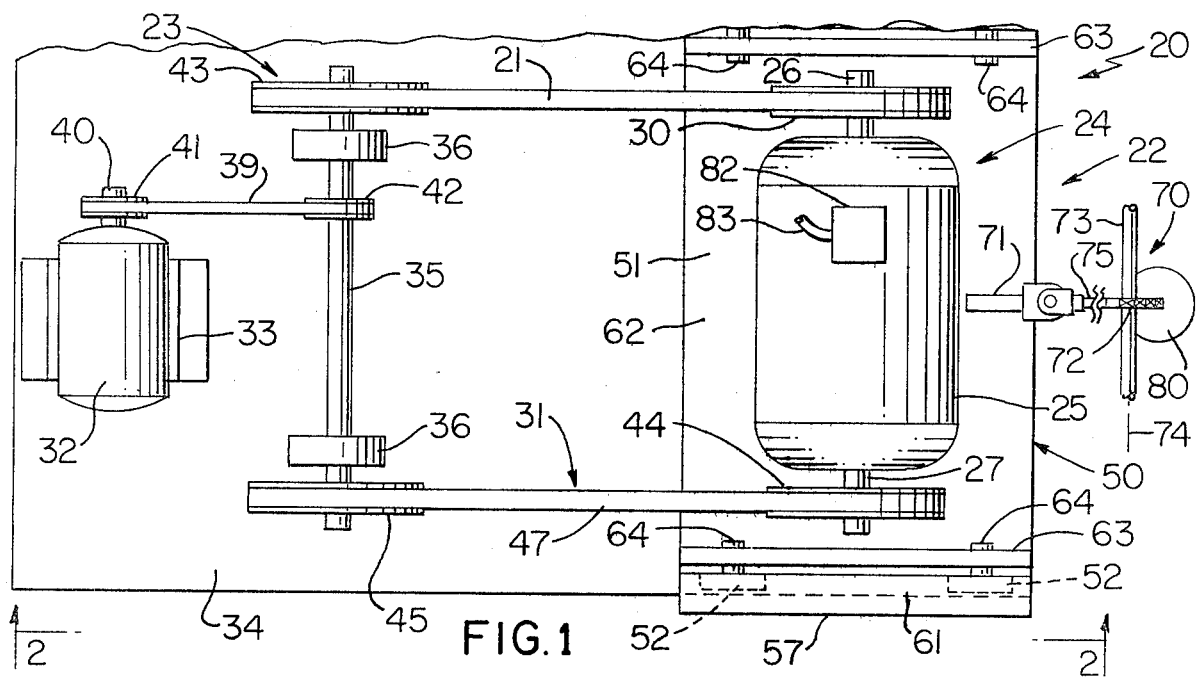
FIG. 1 is a plan view with parts broken away illustrating one exemplary embodiment of the machine and method of this invention.
Figure 2:
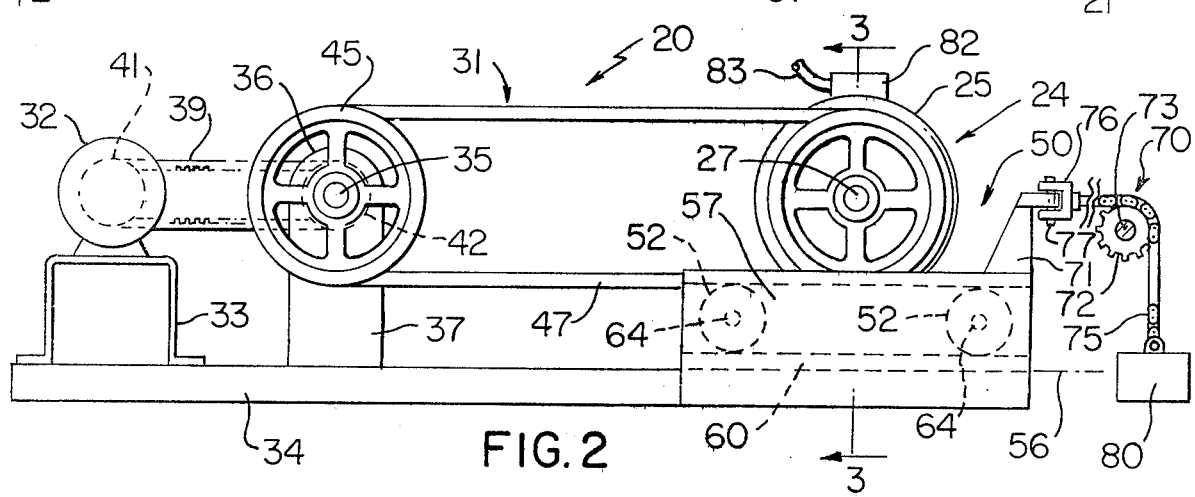
FIG. 2 is a view primarily in elevation with parts broken away and taken essentially on the line 2—2 of FIG. 1.
Figure 3:
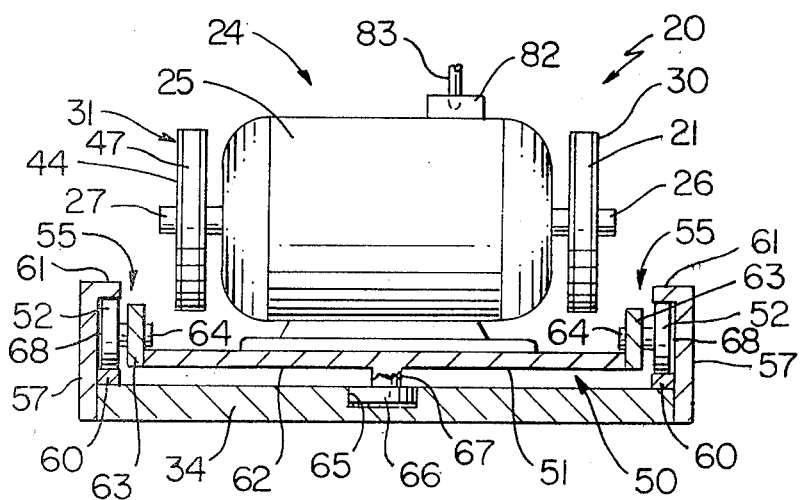
FIG. 3 is a view with parts in cross section and parts in elevation taken essentially on the line 3—3 of FIG. 2.

Reference is now made to FIGS. 1-3 of the drawings which illustrate one exemplary embodiment of the machine and method of this invention designated generally in FIG. 1 by the reference numeral 20. The machine 20 is particularly adapted for testing a power transmission device shown as a power transmission belt 21; and, although the belt may be of any suitable type known in the art, the belt of this example is an endless power transmission belt made primarily of polymeric material.

The machine 20 comprises a drive apparatus or drive which is designated generally by the reference numeral 23 for driving the belt 21 and means 22 for loading the power transmission device or belt 21. The machine 20 of this invention comprises the improvement wherein the loading means 22 comprises a power recovery system 24 which will now be described in detail.

The power recovery system 24 comprises an apparatus or device which for simplicity of presentation will be referred to herein as a coupling 25 and such coupling has an input shaft 26 and an oupout shaft 27. The shafts 26 and 27 are free of mechanical connections therebetween.

The system 24 has first means operatively connecting the power transmission device or belt 21 to the input shaft 26 and in this example such means is in the form of a pulley or sheave 30. The system 24 also has second means, designated generally by the reference numeral 31, operatively connecting the output shaft 27 to the drive 23. The coupling 25 will be described in more detail subsequently; however, basically such coupling has integral means operating to drive the output shaft 27 at a speed which approaches but which is less than the speed of the input shaft 26 as driven by the drive 23, belt 21, and sheave 30 to thereby provide supplementary power for the drive 23 in driving the belt 21. The power recovery system 24 provides testing for any desired loading of the power transmission device or belt 21 with only the power necessary to overcome losses in the overall machine 20, thereby resulting in a substantial power recovery. The manner in which the machine 20 and method 20 accomplish this testing will be more readily apparent from the following description.

The drive 23 of the exemplary machine 20 comprises a drive motor 32, preferably in the form of an electric drive motor 32, which is suitably supported on a support structure 33 which is in turn supported and fixed on a platform 34. The drive 23 also comprises a drive shaft 35 which is suitably supported in spaced relation from the motor 32 and in this example such shaft is disposed horizontally and supported on a pair of antifriction bearing assemblies 36. Each bearing assembly 36 is carried on an associated support column 37 which is in turn fixed on the platform 34. The shaft 35 is operatively connected to and driven by the motor 32 and in particular it will be seen that the motor 32 has an integral shaft 40 extending therefrom which has a toothed sheave or pulley 41 fixed thereto for rotation with the shaft 40. The shaft 35 also has a cooperating toothed sheave or pulley 42 suitably fixed thereto for rotation therewith. A power transmission belt, shown as a toothed belt 39, is operatively connected between the sheaves 41 and 42 so that upon rotating the motor 32 the shaft 40 and the sheave 41 provide simultaneous rotation of the sheave 42 and its shaft 35 through the action of the toothed belt 39.

The shaft 35 has a pulley or sheave 43 suitably fixed to one of its outer ends and the sheave 43 has the power transmission device 21 or belt 21 operatively connected therearound as is known in the art. Once the motor 32 of the drive 23 rotates the shaft 35 the sheave 43 is simultaneously rotated causing rotation of the belt 21 and sheave 30 fixed to the input shaft 26 of the coupling 25.

As previously indicated, the machine 20 has second means 31 operatively connecting the output shaft 27 of the coupling 25 to the drive 23. The second means in this example of the invention consists of a pulley or sheave 44 suitably fixed to the output shaft 27 and another cooperating sheave 45 suitably fixed to the elongate shaft 35 outwardly of an associated bearing assembly 36. An endless power transmission belt 47 extends between and operatively connects the sheaves 44 and 45.

The loading means 22 of the machine 20 comprises a carriage system 50 which supports the coupling 25 for movement relative to the sheave 43 and hence relative to the shaft 35 and motor 32. The carriage system 50 comprises a carriage 51 which has the coupling 25 supported thereon and such coupling is detachably fixed to the carriage 51 using any suitable means known in the art. The carriage 51 has rotatable wheels 52 on opposite sides thereof for supporting such carriage and coupling 25 for movement on the platform 34.

The carriage system 50 has guide means, designated generally by the reference numeral 55, (FIG. 3) for guiding the carriage 51 in a substantially rectilinear path 56 while allowing swiveling movements thereof relative to such rectilinear path 56. The rectilinear path 56 of this example is a substantially horizontal path defined by the horizontal top surface of the platform 34. The guide means 55 comprises a pair of guide rails each designated by the same reference numeral 57 supported in spaced apart relation and suitably fixed against vertically disposed side edge surfaces of the platform 34. The guide rails 57 have a pair of wheel-supporting tracks 60 suitably fixed to their lower portions for receiving associated wheels 52 thereon, and it will be seen that each guide rail 57 has an L-shaped upper portion 61 which overlies associated wheels 52.

The carriage 51 is comprised of a flat horizontally disposed support plate 62 which has upstanding flanges 63 extending upwardly from and fixed to opposite side edges of the plate 62. Each wheel 52 is rotatably supported on an associated shaft 64 which is in turn fixed to an associated flange 63; and, the wheels 52 are guided in a limiting manner by the guide rails 57 against pivoting movements by the carriage 51. The members 52 have been described as wheels for ease of presentation; However, such wheels may be in the form of antifriction wheel-like bearings.

The guide means 55 also comprises an elongate slot 65 in the platform 34 and a guide roller 66, which may also be in the form of a cam roller or wheel, which is received within the slot 65. The roller 66 is rotatably supported on a shaft 67 which extends from the bottom surface of the plate 62 and is thus supported for rotation in a horizontal plane.

The clearance between the outside circumference of the guide roller 66 and the vertical walls of the guide slot 65 is quite small assuring precise rectilinear movement of the carriage along the platform 34. In addition, a clearance 68 is provided between the outside surface of each wheel 52 and the inside surface of its associated guide rail 57 allowing the carriage 51 to swivel a limited amount (as indicated earlier) through a vertical axis through the center of the roller 66 and shaft 67. Thus, the guide means 55 comprised of wheels 52, guide roller 66, and associated components provide guiding of the carriage 51 along the rectilinear path 56 while allowing limited swiveling movements thereof relative to such rectilinear path and in a horizontal plane. This need for pivoting or swiveling movements of the carriage 51 is due to variations in the lengths of production belts such as the belt 21 and 47.

As indicated earlier, the machine 20 has loading means 22, and for testing of power transmission belts such loading means comprises means 70 for pulling the carriage 51 with a constant force. The pulling means 70 comprises a bracket assembly 71 which is fixed to the carriage 51 by any suitable means such as welding, or the like, and a wheel 72 (shown as a sprocket wheel) fixed to a shaft 73 and with the wheel 72 and shaft 73 being supported for rotation about a fixed axis 74 which is disposed substantially perpendicular to the rectilinear path 56 and in spaced relation from the carriage 51. The shaft 73 is preferably supported by antifriction bearings (not shown) and such bearings are disposed on opposite sides of the wheel 72.

The pulling means 70 also comprises a flexible member shown in this example as a sprocket chain 75 which has an inner end provided with a clevis 76 which is used in association with a pin 77 to fasten the inner end of the sprocket chain 75 to the bracket assembly 71. The sprocket chain 75 has an outer end which is provided with a suitable weighted member or weight 80 suitably attached thereto. The flexible member of sprocket chain 75 is supported by the toothed sprocket wheel 72 which receives the sprocket chain 75 therearound so that the teeth in such wheel mesh with the cooperating openings in the sprocket chain whereby the wheel supports the chain 75 for movement therearound with the weight 80 at its terminal outer end. The weight 80 defines a constant force and serves to move the carriage and coupling away from the sheave 43 and in particular away from the sheave 43 and the elongate shaft 35 to thereby provide a tensile load on the belt 21 with the magnitude of such tensile load being determined by the size of the weight 80. The tensile load applied on the belt during testing is usually determined by the tensile loads expected to be encountered by the belt 21 during normal operation.

The coupling 25 has been described herein as having integral means operating to drive its output shaft 27 at a speed which approaches but is less than the speed of its input shaft 26. The coupling may be any suitable coupling that is capable of providing the function described herein; however, such coupling is preferably an electrical coupling and more specifically a stationary field eddy-current coupling which may be suitably cooled by a liquid, or the like. One coupling of this type, which may be employed, is manufactured by the Dynamic Division of Eaton, Yale and Towne, Inc., Kenosha, Wisconsin, 53140. Such a coupling is available with a horsepower rating ranging from 3 through 150 horsepower; and, a 50 horsepower coupling which is useable for many test belts is sold under the Model designation WCS-2141. Basically such a coupling is an adjustable speed slip device which transmits torque by means of electromagnetic forces. Because the above-mentioned coupling is a commercially available item, a detailed description of its construction will not be presented herein. The above coupling is ordinarily utilized with a feedback governor generator which produces a voltage signal in direct proportion to its speed.

However, the coupling 25 used in accordance with the teachings of this invention utilizes a regulated power supply to control output torque of its output shaft 27. In particular, the coupling has a regulated power supply controller 82 which is suitably supported on the housing of coupling 25 and is operatively connected thereto. The controller 82 is provided with electric power from a suitable power source through a cable assembly 83. Among its functions, the controller 82 provides a regulated power supply which will maintain a constant voltage output with normal line variation of input voltage.

For the eddy-current coupling 25 to operate with acceptable efficiency the inherent design thereof is such that the coupling will maintain its output shaft 27, under steady state conditions at a speed and torque which is roughly 90% of the value of the speed and torque of its input shaft 26, i.e., a ratio of 9 to 10. The above-mentioned 9 to 10 ratio may be assured by selecting the proper pitch diameter for the system sheaves. In this example, the sheave 44 has a pitch diameter which is roughly 1.05 times the pitch diameter of the sheave 30, and, the sheave 43 also has a pitch diameter which is roughly 1.05 times the pitch diameter of the sheave 45 with the sheaves 43 and 44 being of the same pitch diameter and the sheaves 30 and 45 also being of the same pitch diameter.

As indicated earlier, this relationship of equal pitch diameter sheaves 30 and 45 having a pitch diameter which is 1.05 times the pitch diameter of the sheaves 43 and 44 is based on the design of the particular eddy-current couplings 25 being used. However, the basic requirement regarding sheave diameters is to have sheaves 30–44 and 43–45 (regardless of size) positioned as shown to make the coupling 25 perform as desired when the belts 21 and 47 are of equal length.

Having described the construction and arrangement of the components of the machine 20, the detailed description will now proceed with the manner in which the apparatus and method of this invention is employed in testing the belt 21. In particular, the belt 21 is installed around its sheaves 43 and 30 and a substantially identical belt 47 is installed around its sheaves 44 and 45. The weight 80 is selected so that its magnitude is equal to twice the tension in each belt 21 and 47.

The eddy-current coupling 25 is then energized with the coupling exitation set at a value of 0 using the power controller 82, whereupon the main drive motor 32 is started. The drive motor 32 of this example is an adjustable speed motor and the speed thereof is set at the desired value. The exitation in the eddy-current coupling 25 is then slowly increased until the desired torque is transmitted from sheave 43 to the belt 21. The operation of the machine 20 which makes possible a power recovery to take place will now be described in more detail.

In particular, when the motor 32 is started and the coupling 25 energized with exitation set at zero, all the power that is required for the main drive motor 32 is that power required to overcome system losses due to friction, windage, and the like. However, when field exitation is applied to the coupling 25, using its power controller 82, and because of the larger pitch diameter 1.05 of the sheave 44 with respect to the pitch diameter of the sheave 30, the output shaft 27 of the coupling 25 tends to overdrive the shaft 35. For example, assume the motor 32 is driving the shaft 35 at 1,000 revolutions per minute (rpm) then the input shaft 26 to the coupling 25 will be driven at 1,050 rpm (1.05 × 1,000). The coupling output shaft because of its inherent design will be driven at approximately 952 rpm (1,000 ÷ 1.05). As more exitation is added to the coupling 25 such coupling tries to make the speed of the output shaft 27 so that it matches the speed of the input shaft 26. However, with the equal length belts and the sheave ratio of the character described, the output shaft 27 tries to increase in speed and the net result is that the coupling 25 will transmit torque to its output shaft 27. The coupling 25 may be noted at 50 horsepower and with the above-described operation, 50 horsepower may be transmitted around the loop defined by the sheave 30, coupling 25, sheave 44, belt 47, sheave 45, shaft 35, sheave 43, and test belt 21.

The above discussion has been presented assuming there is no slippage of the belts 21 and 47. However, if belts 21 and 47 are to be operated under low tension or are the type which provide substantial slippage with respect to their associated sheaves, a ratio greater than 1 to 1.05 may be required for the sheaves 30 to 44 and 45 to 43. Also, if the inherent design of the eddy-current coupling 25 is such that it requires more than 100 rpm slip in order to transmit full torque a greater ratio than 1.05 to 1 may be required in the pitch diameters of the above-mentioned sheaves.

As described above, the machine 20 has so-called second means 31 operatively connecting the output shaft 27 of the coupling 25 to the drive 23. The second means has been described as comprising a belt 47 and this belt 47 may be a high endurance belt which is not the subject of testing, i.e., a non-test belt. However, the belt 47 may also be a test belt which is adapted to be tested simultaneously with the belt 21 whereby, in essence, both belts 21 and 47 are test belts. Regardless of whether the belt 47 is a test belt or not, the use thereof in the machine 20, as presented in FIGS. 1–3, results in such belt 47 transmitting less power than the belt 21. However, the machine and method 20 may be modified to test both belts 21 and 47 under substantially the same power conditions, and as will now be described.

Figure 4:
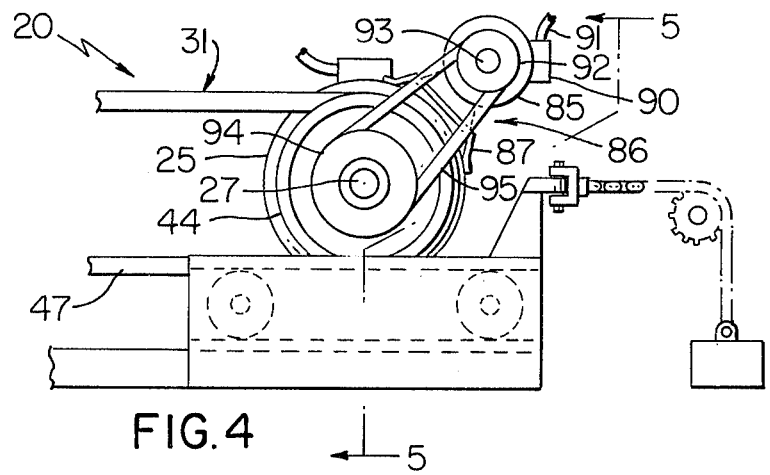
FIG. 4 is a view illustrating a modification of the machine of FIGS. 1-3.
Figure 5:
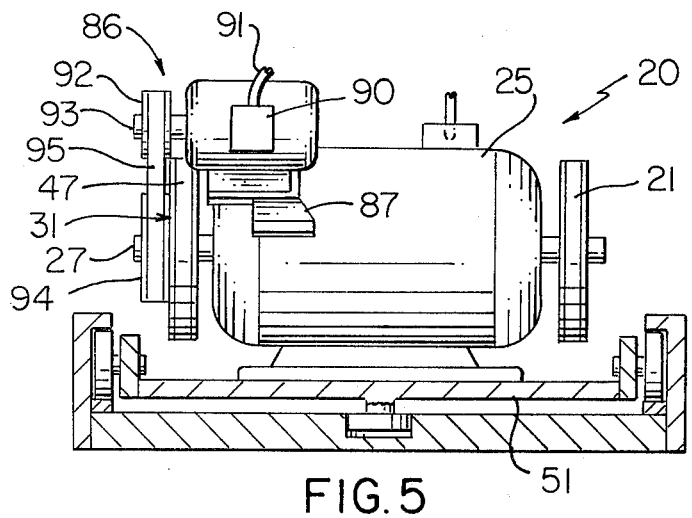
FIG. 5 is a view taken essentially on the line 5—5 of FIG. 4.

In particular, the machine and method 20 may be modified essentially as illustrated in FIGS. 4 and 5 so that both belts 21 and 47 may be tested under the same power conditions. Basically, such modified machine 20 comprises an adjustable output torque motor 85 and means designated generally by the reference numeral 86 operatively connecting the torque motor to the output shaft 27 of the coupling 25. The torque motor 85 provides added torque for the output shaft 27 and cooperates with means 31 operatively connecting the output shaft 27 to the drive 23 to thereby assure that the belt 47 is operated under substantially the same conditions as the belt 21.

The torque motor may be supported by any suitable means on the carriage 51 for movement therewith and hence with the coupling 25 carried by such carriage. In this example, the torque motor 85 is suitably supported on a contoured support bracket 87 which is fixed to the housing of the coupling 25. The motor 85 has a controller 90 detachably fastened to its housing and the controller 90 is provided with power from a suitable power source through a cable assembly 91. The connecting means 86 comprises a sheave 92 suitably fixed on a shaft 93 extending from the torque motor 85 and another sheave 94 connected to the output shaft 27 with an endless power transmission belt 95 operatively connected between sheaves 92 and 94. The sheave 94 is fixed to the output shaft 27 and is disposed coaxially with sheave 44 and shaft 27. The torque motor 85 and its means 86 operatively connecting same to the output shaft 27 of coupling 25, enables the modified machine 20 of FIGS. 4 and 5 to provide testing of two test belts 21 and 47 simultaneously and under substantially the same load conditions.

Thus, it is seen that the machine and method 20 may be used to test a single test belt 21 while recovering power and energy as described above. The machine and method 20 may be used to test two substantially identical belts 21 and 47 with the belt 47 transmitting less power. Finally, the machine and method 20 may be modified by adding a torque motor and associated connecting means to test belts 21 and 47 with both belts transmitting substantially the same power. However, regardless of which of these three situations is being considered, the cooperating action of the coupling 25 and closed loop of the mechanical system results in power (ordinarily wasted in previous systems) being recovered to achieve testing at the desired test conditions thereby producing an overall efficiency generally of the order of 70 to 80%. Further, the power saving machine and method 20 only takes or requires power to the extent necessary to make up losses of the overall machine. Thus, for any particular test, such as a life test, for example, a substantial power recovery is possible.

In this disclosure of the invention reference has been made to the motor 32 being a variable speed electric motor; and, such motor may be any suitable AC or DC motor. In addition, the motor 32 need not necessarily be variable or adjustable speed motor but may be a single speed AC or DC motor.

Other exemplary embodiments of the machine and method of this invention are illustrated in FIGS. 6–7 and 8–9 of the drawings. In particular, the machines of FIGS. 6–7 and 8–9 are very similar to the machine 20; therefore, such machines will be designated by the reference numerals 20A and 20B respectively and representative parts of such machines which are similar to corresponding parts of machine 20 will be designated in the drawings by the same reference numerals as in the machine 20 followed by an associated letter designation A or B and not described in detail. Only those parts which are substantially different from corresponding parts employed in the machine 20 will be designated by a new reference numeral also followed by an associated letter designation, either A or B, and described in detail.

Figure 6:
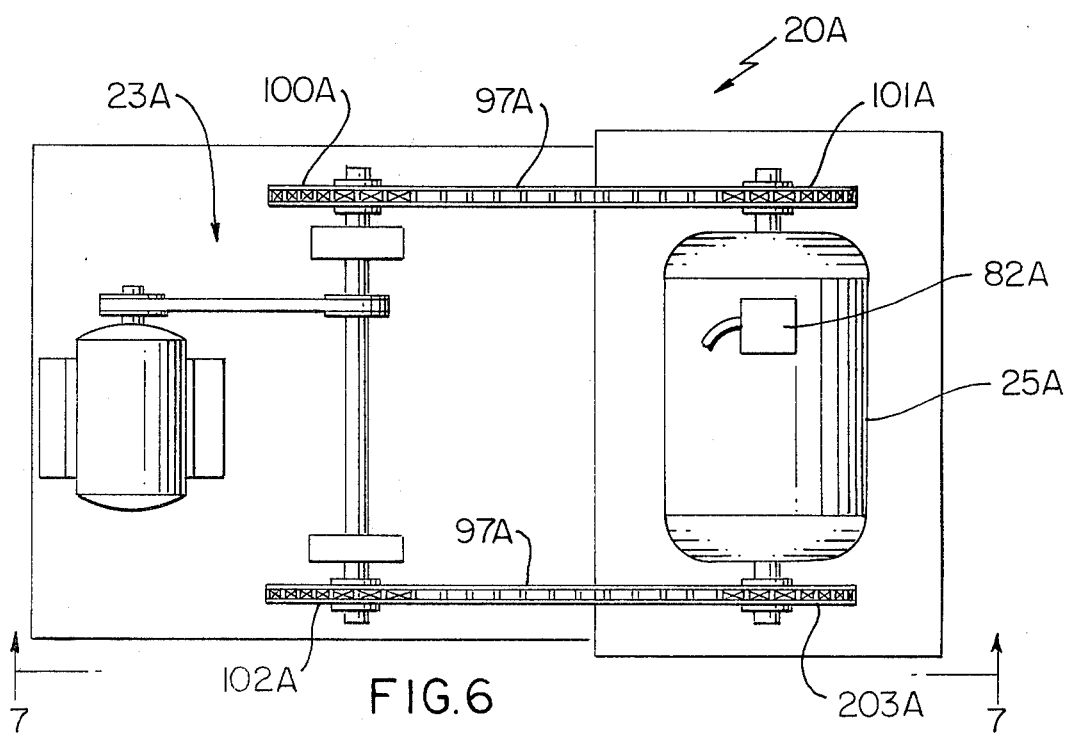
FIG. 6 is a view similar to FIG. 1 illustrating another exemplary embodiment of the machine of this invention employed in testing power transmission devices in the form of sprocket chains and sprocket wheels.
Figure 7:
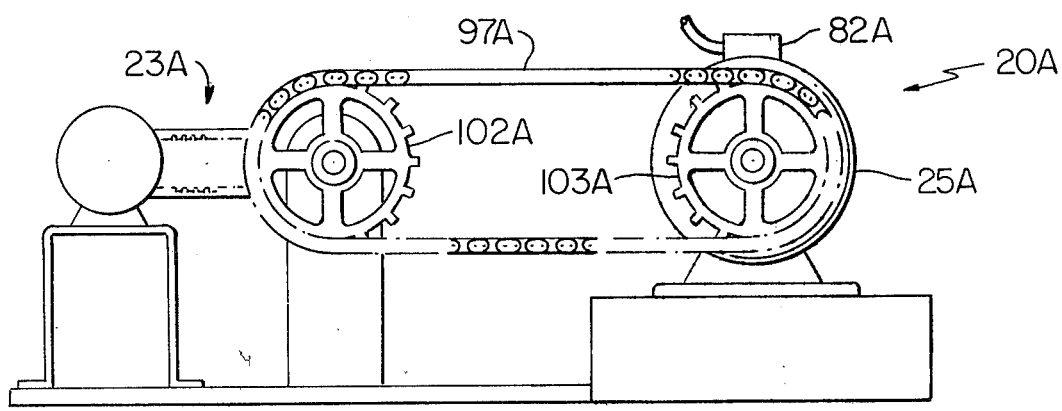
FIG. 7 is a view similar to FIG. 2 taken essentially on the line 7—7 of FIG. 6.

The machine 20A of FIGS. 6 and 7 is provided for testing a power transmission device in the form of a chain mechanism, such as a sprocket chain 97A. Actually machine 20A is used to simultaneously test a pair of sprocket chains 97A in a similar manner as belts 21 and 47 may be tested on the machine 20. Accordingly, the machine 20A utilizes the drive 23A with its main cooperating components and instead of the sheaves 43, 30, 44, and 45 utilizes toothed sprockets 100A, 101A, 102A, and 103A respectively. The machine 20A utilizes a coupling 25A with its associated controller 82A and these components are substantially identical to the components 25 and 82 of machine 20. However, the machine 20A does not require the carriage system with its carriage, nor does it require the means provided in the machine 20 to move such carriage. It will also be appreciated that the machine 20A may be utilized to test wheels in the form of sprocket wheels or sprockets whereby any one or more of the sprockets 100A, 101A, 102A, and 103A may be a test sprocket.

Figure 8:
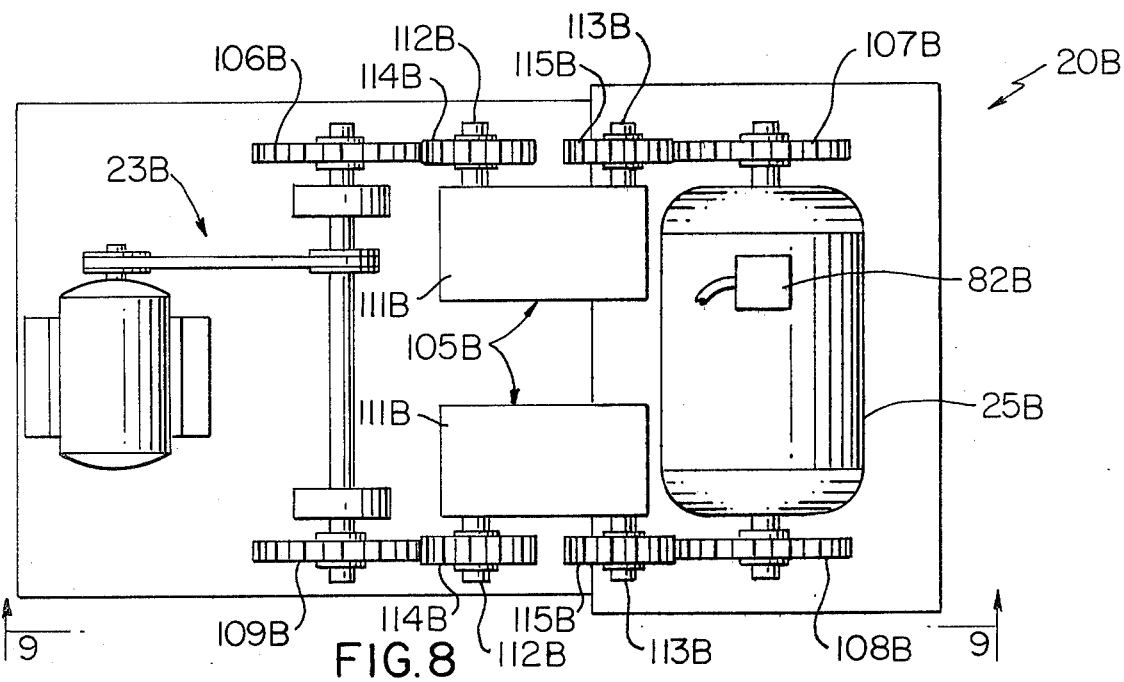
FIG. 8 is a view similar to FIG. 1 illustrating another exemplary embodiment of the machine of this invention employed in testing gear box assemblies and gear wheels.
Figure 9:
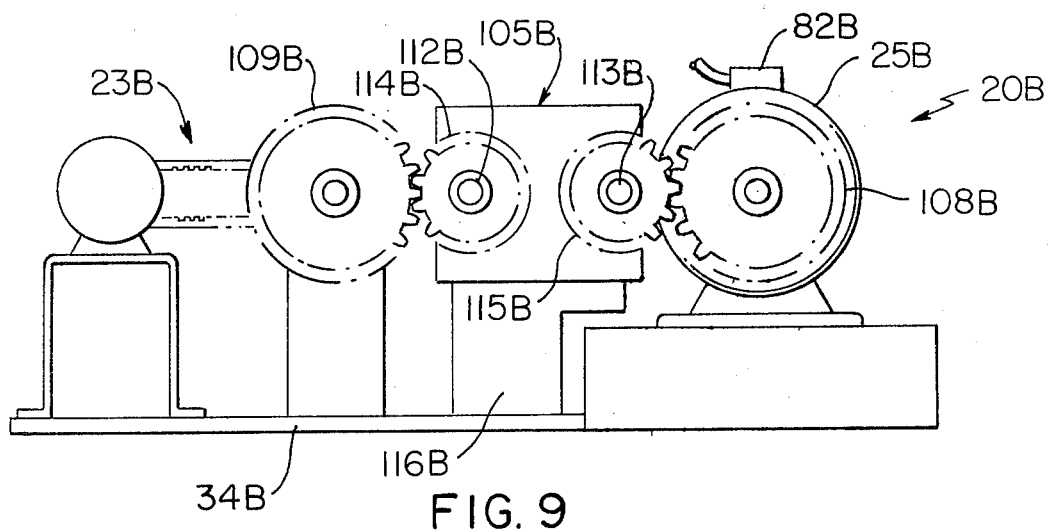
FIG. 9 is a view similar to FIG. 7 taken essentially on the line 9—9 of FIG. 8.

The machine 20B of FIGS. 8 and 9 is provided for testing power transmission devices in the form of gear box assemblies and in this example a pair of gear box assemblies is being tested in a simultaneous manner and each is designated by the same reference numeral 105B. The machine 20B employs the drive 23B and its main associated components; however, instead of sheaves 43, 30, 44, and 45 as used in the machine 20, the machine 20B utilizes gears 106B, 107B, 108B, and 109B. Each gear box assembly comprises a main gear box portion 111B and each main gear box portion has a pair of rotatable shafts 112B and 113B extending therefrom. Each shaft 112B has an associated gear 114B fixed thereto for rotation therewith and each shaft 113B has a gear 115B similarly fixed thereto for rotation therewith. Each gear box assembly 105B is suitably supported on the platform 34B by an associated support structure 116B. Further, the manner in which the various gears mesh with the other gears of the machine 20B will be readily apparent from FIGS. 8 and 9 of the drawings.

As described in connection with the machine 20A it will be appreciated that the machine 20B does not require a carriage system with its carriage and means for pulling the carriage with a constant force. Also, in addition to testing the gear box assemblies 105B, the machine 20B may be used to test power transmission devices in the form of toothed wheels or gears which may be any one or more of the gears 106B through 109B as well as gears 114B and 115B.

The machines 20A and 20B operate in a similar manner as the machine 20 and as indicated earlier the couplings 25A and 25B operate in a similar manner as the coupling 25. The couplings 25A and 25B with their controllers 82A and 82B cooperate with their associated components to provide testing of each power transmission device being tested yet with only the power necessary to overcome losses in the overall machine and thereby resulting in a substantial power recovery. It will be appreciated that each machine 20A and 20B may be provided with suitable mounting means (not shown) to mount its associated coupling 25A and 25B at any desired location on its platform.

As previously indicated the machine and method 20 may be used to test any belt known in the art and although only single element belts are illustrated, for ease of drawing presentation, it will be appreciated that the belts may be multiple-element belts such as so-called banded belts, poly-vee belts and the like. In addition, the belts tested may be so-called cog-type belts or toothed belts, timing belts, or similar belts.

In this disclosure of the invention only certain power transmission devices have been illustrated and described as being tested by the machine and method of this invention; however, it is to be understood that the machine and method of this invention may be employed to test any power transmission device known in the art.

In this disclosure of the invention the source of electrical power for each component, controls for sensing speed and/or torque, and the like, have not been illustrated and described; however, it is to be understood that these and similar items may be commercially available items which are provided as required.

While present exemplary embodiments of this invention, and methods of practicing the same, have been illustrated and described, it will be recognized that this invention may be otherwise variously embodied and practiced within the scope of the following claims.

What is claimed is:

1. In a machine for testing a power transmission device comprising a drive for driving said power transmission device and means for loading said power transmission device, the improvement wherein said loading means comprises a power recovery system comprising, a coupling having an input shaft and an output shaft, said shafts being free of mechanical connections therebetween, first means operatively connecting said power transmission device to said input shaft, and second means operatively connecting said output shaft to said drive, said coupling having integral means operating to drive said output shaft at a speed which approaches but is less than the speed of said input shaft to thereby provide supplementary power for said drive in driving said power transmission device, said system providing testing for any desired loading of said power transmission device with only the power necessary to overcome losses in said machine thereby resulting in a substantial power recovery.

2. A machine as set forth in claim 1 in which said second means comprises a second power transmission device which is adapted to be tested simultaneously with said first-named power transmission device.

3. A machine as set forth in claim 1 in which said power transmission device is a power transmission belt.

4. A machine as set forth in claim 3 in which said belt is an endless belt made primarily of polymeric materials.

5. A machine as set forth in claim 1 in which said power transmission device is a chain mechanism.

6. A machine as set forth in claim 1 in which said power transmission device is a toothed wheel.

7. A machine as set forth in claim 1 in which said power transmission device is a gear box assembly.

8. A machine as set forth in claim 1 in which said power transmission device is a pulley.

9. A machine as set forth in claim 1 in which said power transmission device is a power transmission belt; said first means comprises a first sheave operatively connecting said belt to said input shaft; and said drive comprises, a drive motor, a shaft operatively connected to and rotated by said drive motor, and a second sheave fixed to said shaft for rotation therewith, said second sheave having said belt operatively connected therearound.

10. A machine as set forth in claim 9 in which said drive motor is an electric motor.

11. A machine as set forth in claim 9 in which said loading means further comprises a carriage system supporting said coupling for movement relative to said second sheave enabling application of a predetermined load on said belt.

12. A machine as set forth in claim 11 in which said coupling is a liquid cooled stationary field eddy-current coupling.

13. A machine as set forth in claim 12 in which said carriage system comprises a platform, a carriage having said coupling thereon and having rotatable wheels on opposite sides thereof for supporting said carriage and coupling for movement on said platform, and guide means for guiding said carriage in a substantially rectilinear path while allowing limited swiveling movements thereof relative to said rectilinear path and in a horizontal plane.

14. A machine as set forth in claim 13 in which said guide means comprises a pair of guide rails supported in spaced apart relation on said platform and an elongate guide slot provided in and extending along said platform, said wheels being guided by said guide rails and having a clearance between the outside surface of each wheel and the inside surface of its associated guide rail and said guide means further comprising a guide roller rotatably supported by said carriage, said guide roller being received within said guide slot and allowing said swiveling movements of said carriage about a central vertical axis through said roller.

15. A machine as set forth in claim 13 in which said loading means comprises means for pulling said carriage with a constant force.

16. A machine as set forth in claim 15 in which said means for pulling said carriage comprises a bracket assembly fixed to said carriage, a wheel supported for rotation about a fixed axis substantially perpendicular to said rectilinear path and in spaced relation from said carriage, a flexible member having an inner end and an outer end, said inner end being detachably fastened to said bracket assembly and said flexible member being supported by said wheel for movement therearound, and a weight fixed to said outer end of said flexible member and defining said constant force, said weight serving to move said carriage and coupling away from said second sheave and thereby provide a tensile load on said belt, with the magnitude of said tensile load being determined by the magnitude of said weight.

17. A machine as set forth in claim 1 in which said second means comprises a second power transmission device which is adapted to be tested simultaneously with said first-named power transmission device and further comprising an adjustable output torque motor and means operatively connecting said torque motor to said output shaft to thereby assure that said output shaft in cooperation with said second means operatively connecting said output shaft to said drive operates said second power transmission device at the same conditions as said first power transmission device.

18. A machine as set forth in claim 17 in which said torque motor is an adjustable output electric torque motor.

19. A machine as set forth in claim 1 in which said coupling is a liquid cooled, stationary field, eddy-current coupling.

20. A machine as set forth in claim 19 in which said eddy-current coupling comprises a power controller for controlling output torque of said output shaft.

21. In a method of testing a power transmission device comprising the steps of driving said power transmission device with a drive and loading said power transmission device with loading means during said driving step, the improvement wherein said loading step comprises connecting a power recovery system to said power transmission device during testing, said connecting step comprising, providing a coupling having an input shaft and an output shaft, said shafts being free of mechanical connections therebetween, operatively connecting first means between said power transmission device and said input shaft, and operatively connecting second means between said output shaft and said drive, said coupling having integral means operating to drive said output shaft at a speed which approaches but is less than the speed of said input shaft to thereby provide supplementary power for said drive in driving said power transmission device, said system providing testing for any desired loading of said power transmission device with only the power necessary to overcome power losses in said machine thereby resulting in a substantial power recovery.

22. A method as set forth in claim 21 in which said step of operatively connecting second means between said output shaft and said drive comprises operatively connecting a second power transmission device therebetween which is adapted to be tested simultaneously with said first-named power transmission device.

23. A method as set forth in claim 21 in which said power transmission device is a power transmission belt; said step of operatively connecting said first means comprises a first sheave operatively connecting said belt to said input shaft; and said driving step comprises, providing a drive motor, operatively connecting a shaft to said drive motor for rotation thereof by said drive motor, fixing a second sheave to said shaft for rotation therewith, and operatively connecting said belt around said second sheave.

24. A method as set forth in claim 23 in which said step of providing a drive motor comprises providing a variable speed electric motor and said step of operatively connecting a shaft to said drive motor comprises connecting a power transmission belt therebetween.

25. A method as set forth in claim 23 in which said loading step comprises disposing said coupling on a carriage system to thereby support said coupling for movement relative to said second sheave enabling application of a predetermined load on said belt.

26. A method as set forth in claim 25 in which said step of disposing said coupling on said carriage system comprises disposing a liquid cooled stationary field eddy-current coupling.

27. A method as set forth in claim 25 in which said loading step comprises applying said predetermined load as a constant load.

28. A method as set forth in claim 22 and further comprising the step of operatively connecting an adjustable output torque motor to said output shaft to thereby assure that said output shaft in cooperation with said second means operates said second power transmission device at the same conditions as said first power transmission device.

29. A method as set forth in claim 28 in which said step of operatively connecting said torque motor comprises operatively connecting an adjustable output electric torque motor.

30. A method as set forth in claim 29 and further comprising the step of operatively connecting an electric power controller to said coupling for controlling output torque of said output shaft.

* * * * *